United States Patent [19]

Palmer

[11] Patent Number: 5,796,516

[45] Date of Patent: *Aug. 18, 1998

[54] COLLIMATOR/DIOPTER ASSEMBLY WITH FOLDER OPTICS FOR A NIGHT VISION MONOCULAR DEVICE

[75] Inventor: Gary L. Palmer, Bellevue, Wash.

[73] Assignee: ITT Corporation, New York, N.Y.

[*] Notice: The term of this patent shall not extend beyond the expiration date of Pat. No. 5,737,131.

[21] Appl. No.: 609,216

[22] Filed: Mar. 1, 1996

Related U.S. Application Data

[63] Continuation of Ser. No. 315,339, Sep. 30, 1994, abandoned.

[51] Int. Cl.$^6$ .............................. G02B 23/00; G02B 7/02
[52] U.S. Cl. .......................... 359/399; 359/353; 359/819
[58] Field of Search ............................ 359/399–402, 359/407, 409, 419, 808, 811, 815, 819, 353; 250/214 VT, 330

[56] References Cited

U.S. PATENT DOCUMENTS

| D. 300,038 | 2/1989 | Huckenbeck | D16/132 |
|---|---|---|---|
| 3,944,345 | 3/1976 | Decorato | 359/815 |
| 4,205,894 | 6/1980 | Filipovich et al. | 359/400 |
| 4,291,937 | 9/1981 | Baudot | 359/402 |
| 4,655,562 | 4/1987 | Kreitzer et al. | 250/330 |
| 4,665,430 | 5/1987 | Hiroyasu | 359/402 |
| 4,971,429 | 11/1990 | Ishido et al. | 359/409 |
| 5,084,780 | 1/1992 | Phillips | 359/419 |
| 5,202,706 | 4/1993 | Hasegawa | 359/819 |
| 5,214,533 | 5/1993 | Moracchini | 359/367 |
| 5,223,974 | 6/1993 | Phillips et al. | 359/400 |
| 5,282,082 | 1/1994 | Espie et al. | 359/409 |
| 5,347,397 | 9/1994 | Nelson et al. | 359/402 |
| 5,357,367 | 10/1994 | Goldstein | 359/400 |

FOREIGN PATENT DOCUMENTS

| 125307 | 6/1987 | Japan | 359/808 |
|---|---|---|---|
| 2271195 | 4/1994 | United Kingdom | 359/400 |

*Primary Examiner*—Thong Nguyen
*Attorney, Agent, or Firm*—Plevy & Associates

[57] ABSTRACT

A combined collimator/diopter cell subassembly for use in a monocular optical device. The subassembly has its own housing, wherein the subassembly housing is a two part structure that joins together in a clam shell like fashion. The subassembly housing defines a plurality of reliefs that engage and retain the various lens elements that comprise the collimator and the diopter cell. The subassembly housing also defines slots that retain mirrors, creating a folded optical path whereby light enters the collimator and exists the diopter cell. Since the subassembly housing is shaped to hold the various lenses and mirrors in a predetermined relationship, the amount of labor required to both produce the collimator and diopter and position them within the optical deice is greatly reduced.

16 Claims, 4 Drawing Sheets

COLLIMATOR/DIOPTER ASSEMBLY WITH FOLDER OPTICS FOR A NIGHT VISION MONOCULAR DEVICE

This is a continuation of application Ser. No. 08/315,339, filed on Sep. 30, 1994, entitled COLLIMATOR/DIOPTER ASSEMBLY WITH FOLDER OPTICS FOR A NIGHT VISION MONOCULAR DEVICE, now abandoned.

RELATED APPLICATIONS

The assignee herein, ITT Corporation, is the record owner of related U.S. patent application No. 08/472,677, filed Jun. 7, 1995, now U.S. Pat. No. 5,737,131, is a continuation in part of U.S. patent application No. 08/152,193, filed Nov. 12, 1993 and entitled MONOCULAR NIGHT VISION DEVICES, now abandoned the disclosure of which shall be incorporated into this application by reference.

FIELD OF THE INVENTION

The present invention relates to collimator assemblies and diopter cell assemblies used in night vision devices that enable the light image produced by the image intensifier tube to be viewed at the eyepiece. More particularly, the present invention relates to collimator assemblies with folded optics that direct light from an image intensifier tube on one optical path to a diopter assembly on a second different optical path.

BACKGROUND OF THE INVENTION

Night vision devices are widely used in the military to provide soldiers, aviators and sailors with the ability to view objects at night or during other low light conditions. As a result, many night vision devices are currently being manufactured according to exacting military specifications and designs. Similarly, many such night vision devices are being manufactured for specific military applications such as part of the sights of various weapons or as part of goggle assemblies that attach to an aviator's or soldier's helmet. As a consequence, many of the night vision devices currently being manufactured are neither affordable nor easily adapted to non-military uses by the general public.

One of the most expensive optical components of a military night vision device is the collimator assembly that is used to collimate the output image of the image intensifier tube and present that image to the eyepiece for viewing. Military specifications require very low instances of chromatic aberrations and field curvature distortions. As a result, collimators in military night vision devices use lenses that have exacting tolerances, wherein some of the lenses are made of specialty glass and other lenses serve only to correct minute optical discrepancies. The housing of the military specification collimator is also made to exacting tolerances. As such, the relationship between the various lens elements stays within a tight tolerance regardless to temperature, humidity or evelation.

Many of the exacting tolerances of military night vision devices are not necessary for most commercial uses. Accordingly, by replacing a military specified collimator assembly with a less sophisticated collimator assembly, the overall cost of the night vision device can be greatly reduced.

ITT Corporation, the assignee herein, manufactures many night vision devices and components for night vision devices. A monocular night vision device with an expensive optical collimator is shown in U.S. patent application Ser. No. 08/152,193 to Palmer, entitled Monocular Night Vision Device. The disclosure of the 08/152,193 application is incorporated by reference into the present application because the optics prior to the image intensifier tube, the power supply and overall appearance are generally the same as the present invention. However, in the 08/152,193 application, the collimator used after the image intensifier tube is an expensive binocular collimator such as that found in U.S. patent No. 5,157,553 to Phillips et al, entitled COLLIMATOR FOR BINOCULAR VIEWING SYSTEM. Since a binocular collimator is used, only half of the collimated image is directed toward the single eyepiece of the monocular. A specialized diopter cell assembly is used to direct the image of the collimator to the eyepiece assembly. The separate collimator, eyepiece assembly and diopter assembly make the overall arrangement both difficult to assemble and expensive to manufacture.

It is therefore an object of the present invention to provide a single assembly to replace the need for separate collimator, diopter cell and eyepiece assemblies.

It is a further object of the present invention to provide a less expensive collimator assembly that is specifically designed for use in a monocular device.

These objects are provided for by the present invention as described claimed below.

SUMMARY OF INVENTION

The present invention is a combined collimator/diopter cell subassembly for use in a monocular optical device. The subassembly has its own housing, therefore both the collimator and the diopter cell arrangements are assembled into the monocular device by simply adding the subassembly housing to the monocular device.

The subassembly housing is a two part structure that joins together in a clam shell like fashion. The subassembly housing defines a plurality of reliefs that engage and retain the various lens elements that comprise the collimator and the diopter cell. The subassembly housing also defines slots that retain mirrors, creating a folded optical path whereby light enters the collimator and exits the diopter cell. Since the subassembly housing is shaped to hold the various lenses and mirrors in a predetermined relationship, the amount of labor required to both produce the collimator and diopter and position them within the optical deice is greatly reduced.

The optical design of the collimator and the diopter cell is also simplified. The collimator consists of only three lenses while the diopter cell consists only of two. This simple optical arrange greatly reduces the cost of the overall night vision device while producing only negligible reductions in image quality.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Figure 1:
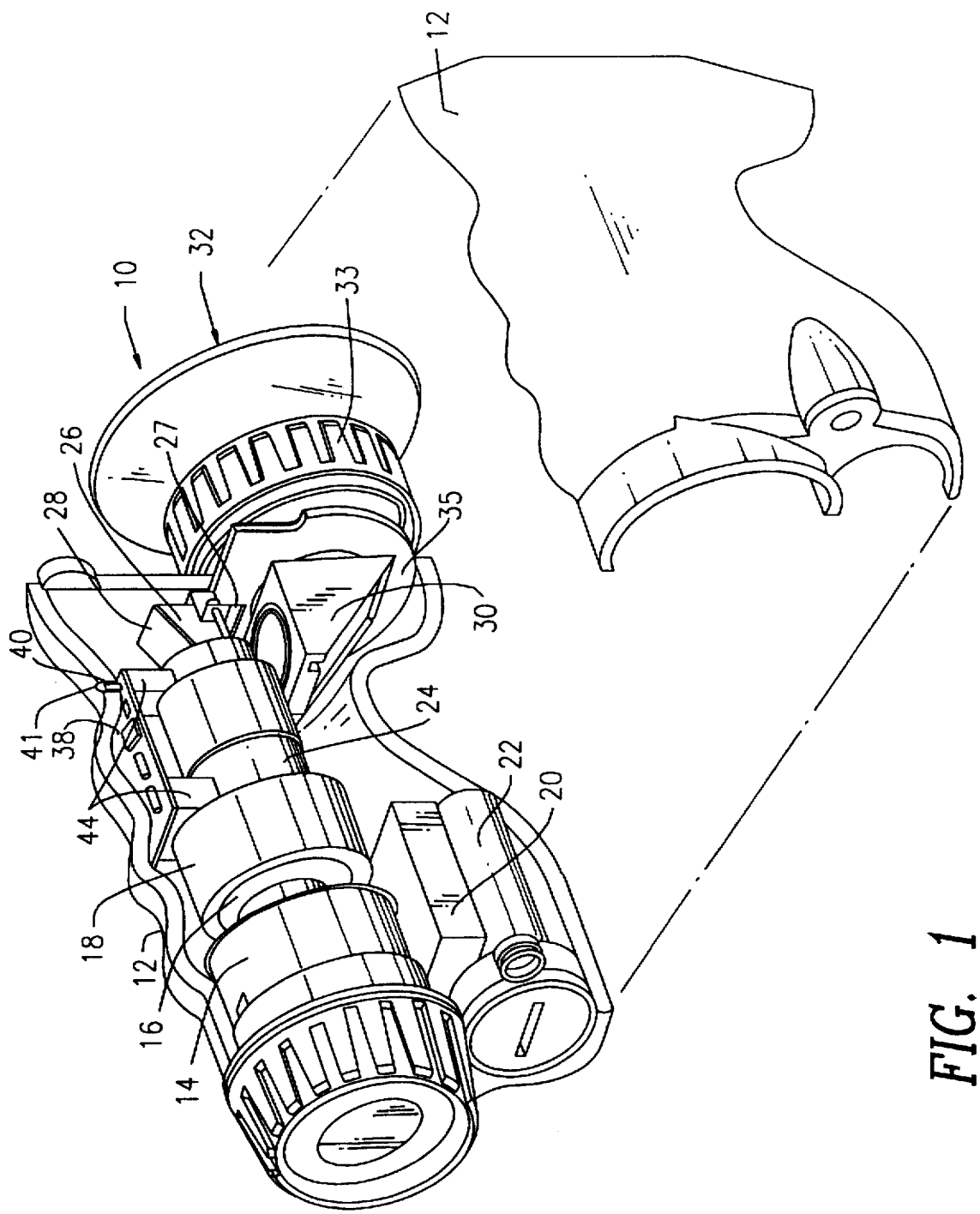
FIG. 1 is an exploded perspective view of a monocular night vision device using a binocular collimator and a separate diopter cell assembly.

Referring to FIG. 1 there is shown a monocular device 10 such as that described in U.S. patent application No. 08/152,193 to Palmer, entitled MONOCULAR NIGHT VISION DEVICE. The monocular device 10 has a two piece housing 12 that is ergonomically shaped to be held in one hand. An adjustable objective lens assembly 14 extends through the forward portion of the housing 12. The objective lens assembly 14 focuses an objective image onto the input surface 16 of an image intensifier tube 18. The image intensifier tube 18 is powered by a power supply 20 that is coupled to batteries (not shown) contained within a battery receptacle 22. The image intensifier tube 18 creates an intensified image that is received by a collimator assembly 24. In the shown embodiment, the collimator assembly 24 is of a type designed for use in a binocular device, such as the collimator assembly described in U.S. Pat. No. 5,223,974 to Phillips et al, entitled COLLIMATOR FOR BINOCULAR VIEWING SYSTEM. Such collimator assemblies have bifurcating mirrors 26 that divide a collimated image emanating from the collimator assembly 24 into two opposite paths.

In the shown embodiment, only one of the two optical paths created by the bifurcating mirror 26 is used. The collimated image reflecting off of the lower surface 27 of the bifurcating mirror 26 is directed into a diopter cell assembly 30. The collimated image reflecting off of the upper surface 28 of the bifurcating mirror 26 is wasted and serves no useful purpose. The diopter cell assembly 30 redirects the collimated light into the eyepiece assembly 32. The eyepiece assembly 32 is focused by the turning of focus wheel 33 in the conventional manner. The diopter cell assembly 30 and the eyepiece assembly 32 are held in position within the housing 12 by a flange 35 that is rigidly adhered to both the diopter cell assembly 30 and the eyepiece assembly 32. The flange 35 is adhesively mounted to the housing 12 in a manual manufacturing procedure.

A circuit board 38 is contained within the monocular device 10 that controls the activation and deactivation of the image intensifier tube 18. A push button switch 40 is disposed on the circuit board 38, wherein the push button switch 40 extends through an aperture 41 at the top of the housing 12. The circuit board 38 is held in position by two mounting elements 44 that connect the circuit board 38 to the collimator assembly 24. The circuit board 38 is manually attached to the mounting elements 44 with adhesive. Similarly, the mounting elements 44 are manually attached to the collimator assembly 24 with adhesive.

Besides the labor required to manufacturing the monocular device 10 of FIG. 1, another major disadvantage is that the optical elements in the collimator assembly 24, diopter cell assembly 30 and the reflector surfaces of the bifurcating mirror 26 are exposed within the housing 12. As a result, contaminants such as adhesive easily pollute these optical elements. Furthermore, any dust, dirt or moisture that finds its way into the housing 12 can also contaminate these unprotected optical elements. The unused light reflected off of the upper surface 28 of the bifurcating mirror 26 illuminates the interior of the housing 12. The stray light is received by the diopter cell assembly 30, wherein the stray light detracts from the quality of the image being viewed.

Figure 2:
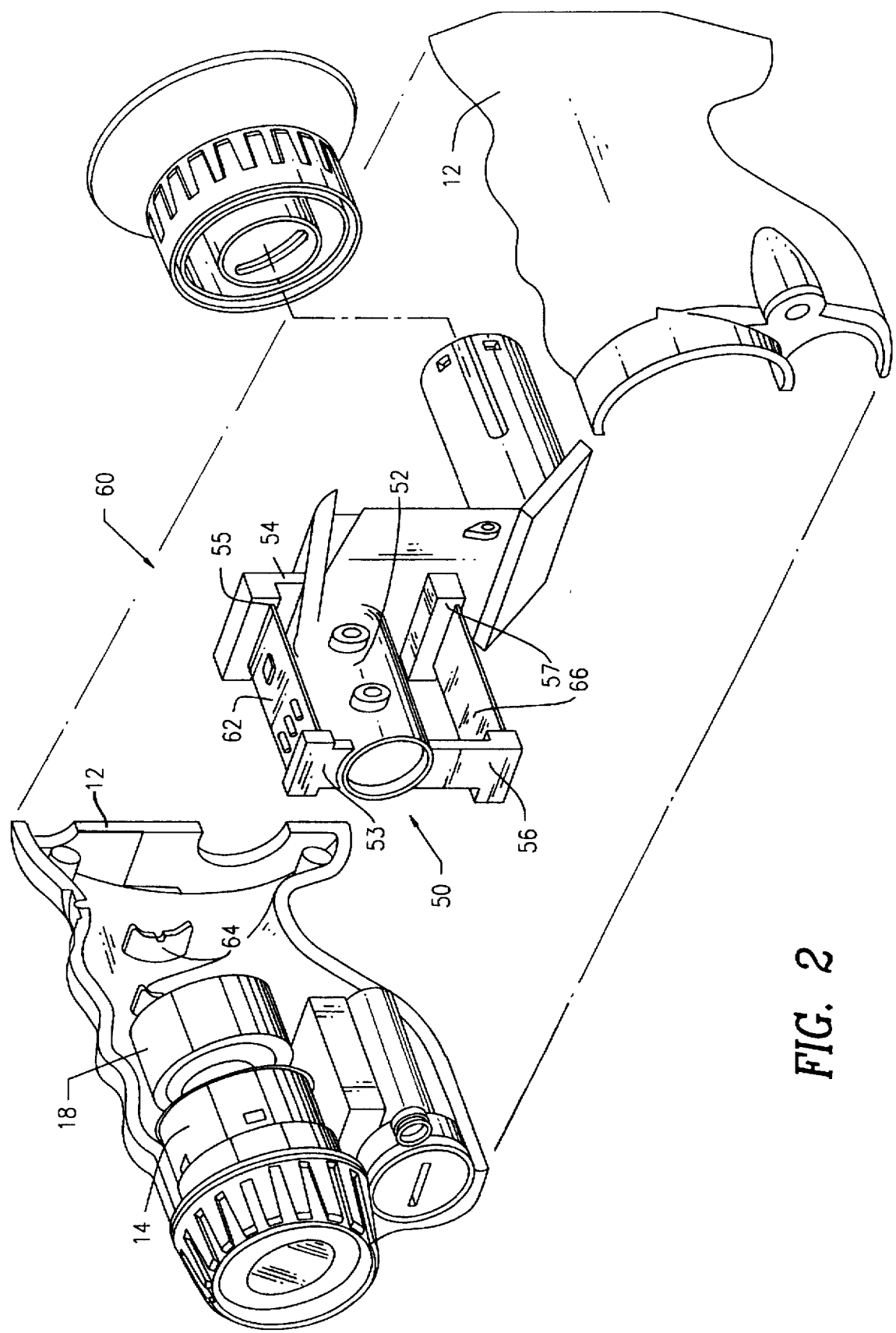
FIG. 2 an exploded view of a monocular night vision device with the present invention collimator/diopter cell subassembly.

Referring now to FIG. 2 a preferred embodiment of the present invention collimator/diopter assembly 50 is shown in conjunction with the same housing 12, objective lens assembly 14 and image intensifier tube 18 that was shown in the embodiment of FIG. 1. In the shown embodiment, the collimator and diopter cell assembly are replaced by a single collimator/diopter assembly 50, having folded optics in an arrangement that will later be explained. The optical elements of the collimator/diopter assembly 50 are all contained within a subassembly housing 52 that protects those optical elements from contamination and facilitates the easy mounting of those elements into the overall monocular device 60.

In FIG. 2, two flanges 53, 54 extend upwardly from the top of the subassembly housing 52. The flanges 53, 54 serve two purposes. First, the flanges 53, 54 define slots 55. The slots 55 correspond in height and width to the height and width of the circuit board 62. Accordingly, the slots 55 can engage the ends of the circuit board 62 and hold it in its proper position without the need for mounting elements or adhesive. The flanges 53, 53, also engage the various support ribs 64 that extend inwardly from both halves of the primary housing 12. The abutment of the flanges 53, 54 against the various support ribs 64 positions the collimator/diopter assembly 50 at a predetermined orientation within the primary housing 12.

An optional slotted lower flange 56 may extend from below the subassembly housing 52. A slot 57 may be formed on the subassembly housing 52 opposite the slotted flange 56, whereby a second circuit board 66 may be supported. The second circuit board 66 may contain optional circuits such as low battery indicator controls and the like.

Figure 3:
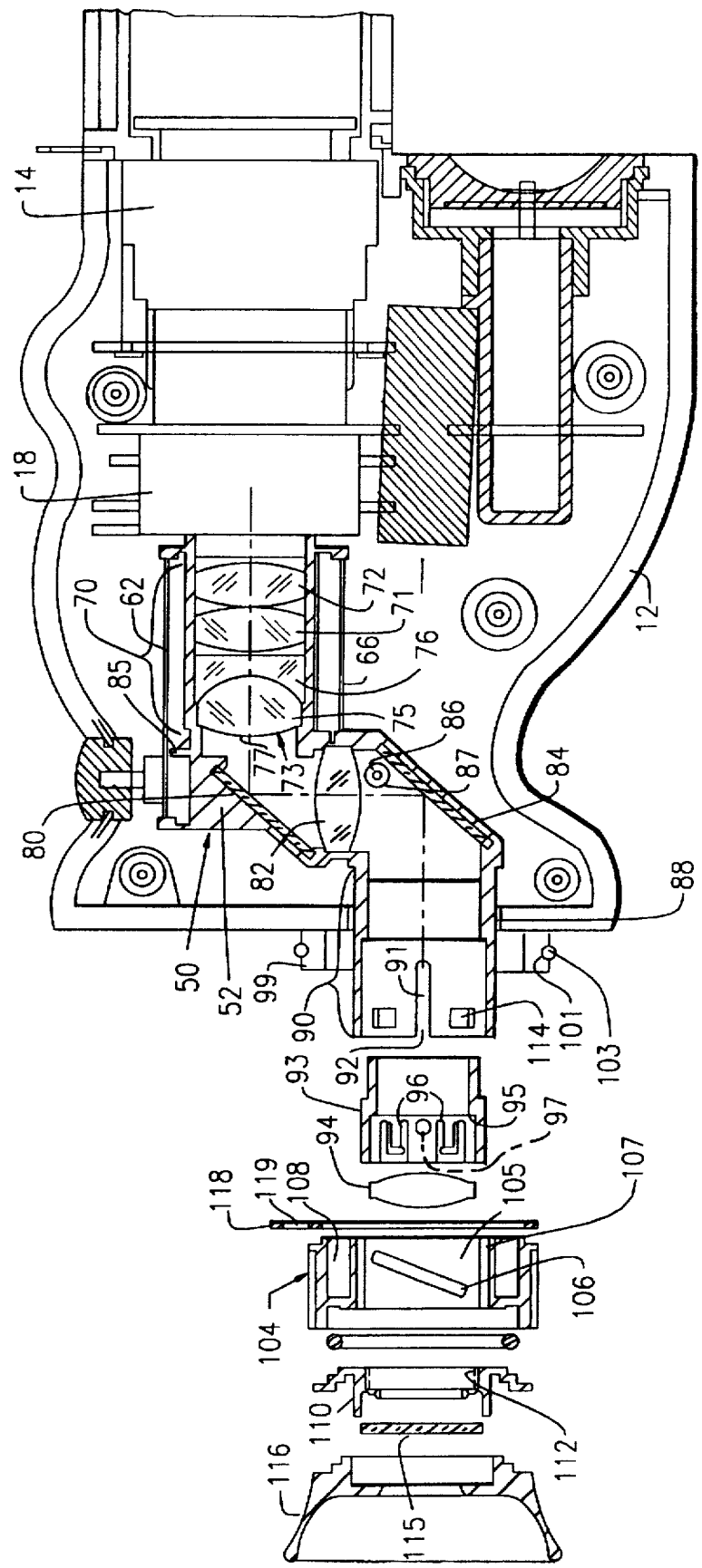
FIG. 3 is a cross-sectional view of the monocular night vision device of FIG. 2.

Referring to FIG. 3 it can be seen that the portion 70 of the collimator/diopter assembly 50 that is concentrically aligned with the image intensifier tube 18 and the objective lens assembly 14 contains two biconvex lenses 71, 72, and a doublet 73. It is the lenses in the concentric portion 70 that produce a collimator and collimate the image from the image intensifier tube 18. In the preferred embodiment, two biconvex lenses 71, 72 are identical having a radius of 52.1 mm on both sides and a center line width of 3.02 mm. The glass material of the biconvex lenses 71, 72 is preferably SK-16 620 603. The doublet 73 consists of a biconvex lens 75 cemented to a plano-concave lens 76. In the shown embodiment, the biconvex lens 75 has a first surface 77 of a 43.468 mm radius. The surface shared with the plano-concave lens 76 has a radius of 12.45 mm. The centerline width of the biconvex lens 75 is 8.00 mm and its glass type is preferably BaF-4 606 439. The centerline width of the plano-concave lens 76 is 3.00 mm and its glass type is preferably SF-4 755 276. The centerline of distance between the doublet 73 and the first biconvex lens 71 is 4.00 mm and the centerline distance between the two biconvex lenses 71, 72 is 3.00 mm.

The subassembly housing 52 retains a first mirror 80 on the same line as the doublet 73 and two biconvex lenses 71, 72. The doublet 73 and the two biconvex lenses 71, 72 collimate the intensified image produced by the image intensifier tube 18. The collimated image is reflected off of the first mirror 80, whereby the optical path of the image is offset by 90° and the reflected image is directed through a first aspheric lens 82. When positioned within the subassembly housing 52, the steeper radius of the aspheric lens 82 is oriented toward the first mirror 80. After passing through the first aspheric lens 82, the image is again offset by 90° by reflecting off of a second mirror 84. The second mirror 84 directs the image into an adjustable eyepiece assembly, the function of which will be later explained.

The subassembly housing 52 is a two piece assembly. The various lenses and mirrors within the subassembly housing 52 are held in place by those elements into correspondingly shaped reliefs molded into the structure of the subassembly housing 52. As a result, when the various mirrors and lens are closed between the two halves of the subassembly housing 52, they are held firmly at predetermined positions without need of adhesive, spacer elements or other such labor intensive manufacturing elements.

In FIG. 3 an optional support element 85 is shown extending upwardly from the top of the subassembly housing 52. The support element 85 engages the bottom surface of the circuit board 62 below the push button switch 40. As a result, the support element 85 prevents the circuit board 62 from bending when the push button switch 40 is manually manipulated. An optional aperture 86 may also be disposed in the subassembly housing 52 in between the first aspheric lens 82 and the second mirror 84. An LED 87 may partially extend into the subassembly housing 52 through the aperture 86. The LED 87 is coupled to the second circuit board 66 and can be used to superimpose a red light in to the viewed image indicative of a low battery condition or a similar warning.

Figure 4:
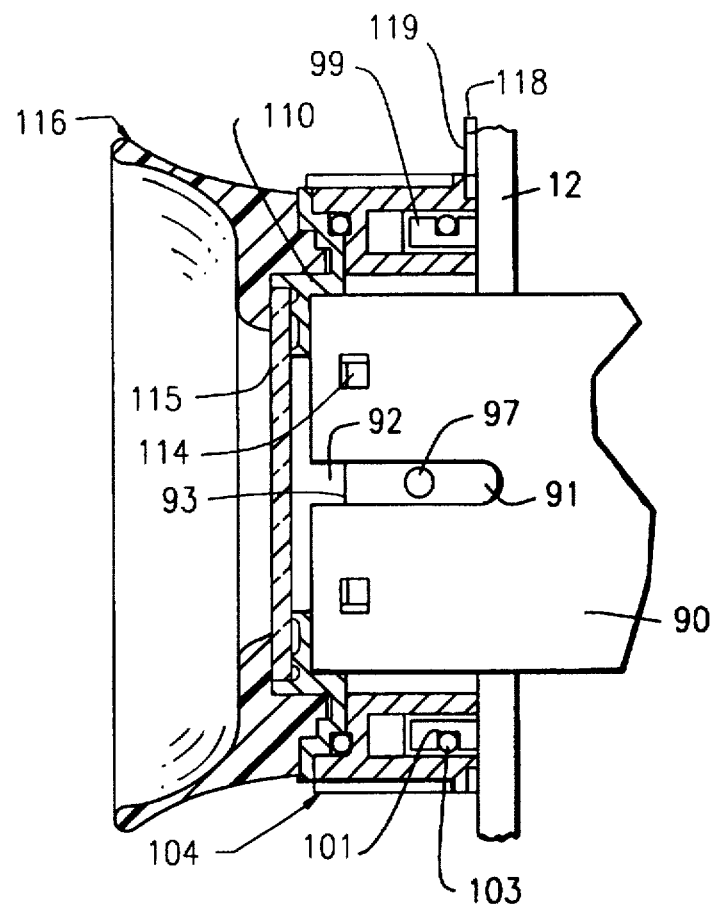
FIG. 4 is a cross-sectional view of the eyepiece assembly portion of the present invention.

Referring to FIG. 3 in conjunction with FIG. 4, it can be seen that the image reflected off of the second mirror 84 it is directed through the center of the eyepiece region 90 of the subassembly housing 52. The eyepiece region 90 of the subassembly housing 52 extends out of the primary housing 12 through an aperture 88. The segment of the eyepiece region 90 extending beyond the primary housing 12 is slotted containing two oppositely oriented slots 91. Each slot 91 has an open end 92 that communicates with the larger open end of the subassembly housing 52. A lens retainer 93 is sized to fit within the eyepiece region 90 of the subassembly housing 52. An aspheric lens 94 is mounted with the lens retainer 93, wherein the aspheric lens 94 is held between an internal ledge 95 and a plurality of locking pawls 96. Two pegs 97 radially extend from opposite sides of lens retainer 93. The pegs 97 pass into the slots 91 on the subassembly housing 52 as the lens retainer 93 is joined to the subassembly housing 52. The presence of the pegs 97 within the slots 91 allows the lens retainer 93 to reciprocally move back and forth in the same direction as the longitudinal direction of the slots 91. However, the pegs 97 engagement in the slots 91 prevents the lens retainer 93 from rotating about its central axis.

An annular member 99 extends from the main housing 12. The annular member 99 surrounds, and is concentric with, the aperture 88 through which the subassembly housing 52 extends from the main housing 12. An O-ring groove 101 is disposed on the exterior cylindrical wall of the annular member 99, wherein the O-ring groove 101 receives and retains and O-ring 103. A focus wheel 104 engages the annular member 99 and the lens retainer 93 within the subassembly housing 52. An aperture 105 passes through the center of the focus wheel 104. Two oppositely oriented grooves 106 are formed on the cylindrical wall 107 that defines the aperture 105. The grooves 106 are angled so that the opposite ends of each groove 106 are proximate opposite sides of the focus wheel 104. An annular recess 108 is also present within the focus wheel 104. When assembled, the annular member 99 on the housing 12 extends into the annular recess 108 on the focus wheel 104. The pegs 97 on the lens retainer 93 pass into the angled grooves 106. As a result, when the focus wheel 104 is rotated the pegs 97 ride along the angled grooves 106 in a cam-like fashion. Accordingly, the angled grooves 106 force the pegs 97 to move back and forth along the slots 91 in the subassembly housing 52. This causes the lens retainer 93 to move within the subassembly housing 52 which results in a change in the distance between the two aspheric lenses 82, 94.

The focus wheel 104 is held in position by an annular cap member 110. Locking projections 112 extend from the interior of the annular cap member 110. The locking projections 112 engage lock apertures 114 formed through the subassembly housing 52, thereby joining the annular cap member 110 to the subassembly housing 52. The annular cap member 110 thereby acts as a hub, holding the focusing wheel 104 flush against the housing 12. A protective window 115 connects to the annular cap member 110 and is held in place by the elastomeric eye shield 116, thereby completing the assembly.

An optional strap anchor 118 can be added to the assembly between the focus wheel 104 and the housing 12. The strap anchor 118 defines a hoop 119 through which a carrying strap can be connected to the monocular assembly.

It will be understood that the night vision binocular assembly described herein is merely exemplary and that a person skilled in the art may make many variations and modifications to the described embodiments utilizing functionally equivalent components to those described. All such variations and modifications are intended to be included within the scope of this invention as defined by the appended claims.

What is claimed is:

1. A night vision device, comprising:
   a primary housing;
   an image intensifier tube disposed in said housing, wherein said image intensifier tube produces a visible image;
   a collimator lens arrangement having a first plurality of lenses, for collimating said image;
   an eyepiece lens arrangement for viewing said image, wherein said eyepiece lens arrangement includes a second plurality of lenses for focusing the image collimated by said collimator lens arrangement;
   a subassembly housing for retaining at least one of said first plurality of lenses and at least one of said second plurality of lenses, whereby said subassembly housing is contained within said primary housing at a predetermined orientation; and
   means coupled to said subassembly housing for retaining at least one circuit board in a predetermined relationship with said subassembly housing, said at least one circuit board having edges associated therewith.

2. The night vision device according to claim 1, wherein all of said first plurality of lenses are contained within said subassembly housing.

3. The night vision device according to claim 1, wherein the image from said image intensifier tube enters said first plurality of lenses along a first optical path and exits said second plurality of lenses along a different second optical path.

4. The night vision device according to claim 1, further including at least one reflective surface, contained within said subassembly housing, that directs the image from a first optical path to a second optical path.

5. The night vision device according to claim 1, wherein said subassembly housing has a first half and a second half, said first half and said second half of said subassembly housing defining a plurality of reliefs that engage and retain said first plurality of lenses in a predetermined optical arrangement within said subassembly housing.

6. The night vision device according to claim 5, further including a first reflective surface, contained within said subassembly housing, that redirects the image passing through said collimator along a first optical path to a second optical path and a second reflective surface, also contained within said subassembly housing, that redirects the image on said second optical path to a third optical path that is generally parallel to said first optical path.

7. The night vision device according to claim 6, wherein said first half and said second half of said subassembly housing define two reliefs that respectively engage and retain said first reflective surface and said second reflective surface within said subassembly housing.

8. The night vision device according to claim 6, wherein said second plurality of lenses includes at least one lens disposed on said second optical path and said third optical path.

9. The night vision device according to claim 1, wherein said means for retaining at least one circuit board includes slots disposed in said subassembly housing that engage and retain the edges associated with said at least one circuit board.

10. The night vision device according to claim 1, further comprising a focusing means for selectively focusing said eyepiece lens arrangement.

11. The night vision device according to claim 10, wherein said second plurality of lenses includes an ocular lens positioned a predetermined distance from a subsequent lens along an optical path, wherein said focusing means includes a means for selectively varying said predetermined distance.

12. A monocular night vision device comprising:

a primary housing;

an objective lens assembly for receiving light;

an image intensifier tube, contained within said primary housing, for intensifying the light received by said objective lens assembly and producing an intensified image therefrom;

a subassembly that includes:

ii. a collimator lens assembly for collimating the intensified image from the image intensifier tube;

ii. an eyepiece lens assembly, containing a plurality of lenses, wherein the eyepiece lens assembly receives a collimated image from the collimator lens assembly;

iii. a subassembly housing for retaining said collimator lens assembly and at least one of said plurality of lenses from said eyepiece lens assembly in a predetermined relationship; wherein said primary housing retains said subassembly housing in a predetermined orientation relative to the image intensifier tube, said subassembly housing including a means for retaining and holding at least one circuit board in a predetermined orientation within said primary housing.

13. The device according to claim 12, wherein said subassembly further includes at least one reflective surface within said subassembly housing, wherein said at least one reflective surface directs the image produced by said image intensifier tube from said collimator lens assembly to said eyepiece lens assembly.

14. The device according to claim 12, wherein said primary housing contains a plurality of support ribs that extend inwardly into the primary housing, and said subassembly housing is shaped to engage said support ribs wherein said support ribs retain said subassembly housing in said predetermined orientation relative to the image intensifier tube.

15. The device according to claim 12, wherein said at least one circuit board contains a manually manipulative switch that extends through an aperture in said primary housing.

16. The device according to claim 12, wherein said subassembly housing defines reliefs that mechanically retain lenses associated with said collimator lens assembly and said eyepiece lens assembly in a predetermined optical relationship.

* * * * *